United States Patent
Nakamichi et al.

(10) Patent No.: US 6,863,515 B2
(45) Date of Patent: Mar. 8, 2005

(54) OPTICAL FIBER RECOATING DEVICE

(75) Inventors: Takashi Nakamichi, Sakura (JP); Junichi Suzuki, Sakura (JP); Takeshi Sato, Sakura (JP)

(73) Assignee: Fujikura Ltd., Tokyo (JP)

( * ) Notice: Subject to any disclaimer, the term of this patent is extended or adjusted under 35 U.S.C. 154(b) by 159 days.

(21) Appl. No.: 10/269,456

(22) Filed: Oct. 11, 2002

(65) Prior Publication Data

US 2003/0108634 A1 Jun. 12, 2003

(30) Foreign Application Priority Data

Dec. 10, 2001 (JP) .................................. P2001-375182

(51) Int. Cl.[7] .............................................. B29C 45/14
(52) U.S. Cl. ..................... 425/116; 264/263; 264/496; 425/174.4
(58) Field of Search .......................... 425/116, 174.4; 264/263, 496

(56) References Cited

U.S. PATENT DOCUMENTS

| | | | | |
|---|---|---|---|---|
| 3,299,468 A | * | 1/1967 | Moore .................... | 425/174.4 |
| 4,636,405 A | * | 1/1987 | Mensah et al. ............. | 427/493 |
| 4,662,962 A | * | 5/1987 | Malavieille ................ | 156/158 |
| 4,728,469 A | * | 3/1988 | Danner et al. ............. | 264/1.38 |
| 4,913,859 A | * | 4/1990 | Overton et al. ............ | 264/1.27 |
| 5,277,730 A | * | 1/1994 | Darsey et al. ............. | 156/158 |
| 5,782,460 A | * | 7/1998 | Kretzschmar et al. ..... | 264/1.36 |
| 6,688,870 B2 | * | 2/2004 | Shibata et al. ............. | 425/117 |

FOREIGN PATENT DOCUMENTS

| | | | | |
|---|---|---|---|---|
| JP | 59070509 A | * | 4/1984 | ........... B29C/11/00 |
| JP | 6-148452 | | 5/1994 | ........... G02B/6/255 |

OTHER PUBLICATIONS

Junichi Suzuki, et al., U.S. Patent Application entitled "Optical Fiber Recoating Device", filed Oct. 10, 2002.

* cited by examiner

Primary Examiner—Robert B. Davis
(74) Attorney, Agent, or Firm—Darby & Darby

(57) ABSTRACT

The present invention relates to an optical fiber recoating device. In the optical fiber recoating device, the bare fiber portion of an optical fiber is recoated by filling a recoating resin into molds made of a transparent or semi-transparent material and curing the recoating resin with light from a resin curing lamp that is provided to one side of either of molds. Furthermore, a reflective coating layer is provided to sides of molds where the resin curing lamp is not located, and the light from the resin curing lamp directly radiate and are reflected to radiate onto the bare fiber portion of optical fiber. As a result, the cost of the device is reduced and resin curing is promoted.

9 Claims, 13 Drawing Sheets

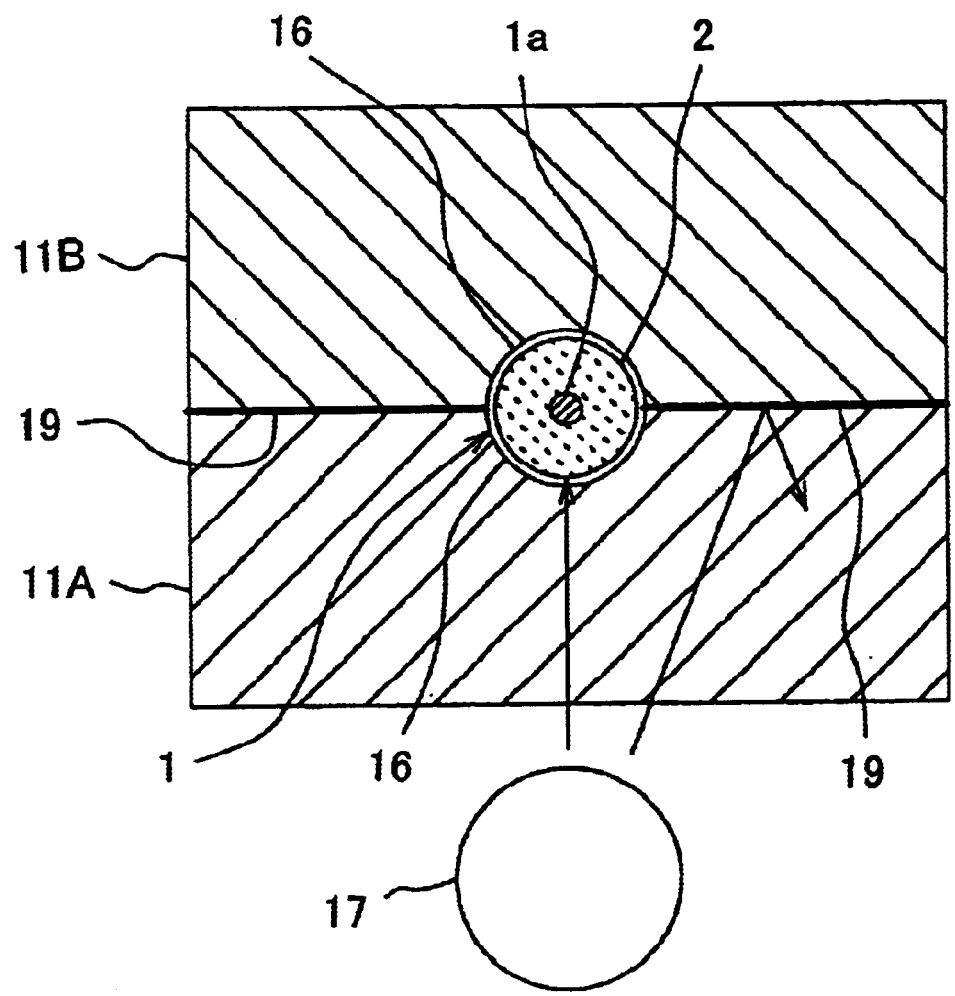

OPTICAL FIBER RECOATING DEVICE

BACKGROUND OF THE INVENTION

1. Field of the Invention

The present invention relates to an optical fiber recoating device for reapplying a resin coating to areas along an optical fiber where a sheath has been removed. More specifically, the present invention relates to a design which reduces the cost of the device and which promotes resin curing.

2. Description of the Related Art

When connecting optical fibers using heat fusion, or after removing damaged areas of a sheath of the optical fiber, it is necessary to reapply resin to these areas (i.e., to the bare fiber areas) in order to protect the optical fiber. In other words, the optical fiber must be recoated.

A number of devices have been proposed as conventional recoating devices. One example of these is a device such as shown in FIGS. 9 and 10 which is of a type (mold type) in which recoating is performed by filling recoating resin into a mold made of glass.

This recoating device 10 has upper and lower molds 11A and 11B which are typically made of a material such as quartz glass which has excellent light transmitting properties. These molds 11A, 11B are provided between a base 12 and a lid 13 which is attached to the base 12 so as to enable opening and closing thereof. The recoating resin (typically a UV curable resin) is filled into the respective semicircular mold grooves 16 of the molds 11A, 11B via resin filling routes 14, 15 which are formed in the lid 13 and upper mold 11B, for example.

As shown in FIG. 11, for example, the length of each mold groove 16 is designed to be longer than a bare fiber part 1a of an optical fiber 1 which is provided by connecting two optical fibers using heat fusion.

When this optical fiber 1 is set in place in respective mold grooves 16 of the molds 11A, 11B, a nearly closed cylindrical space (mold space) is formed inside the mold grooves 16 at the bare fiber part 1a. The recoating resin is then filled into the space, and a recoated sheath 2, i.e., a molded portion, is formed.

Furthermore, when a resin curing lamp 17, such as a UV lamp, is provided on the base 12 side for example, and UV light is radiated at this time, curing of the resin can be promoted and the rapid recoating can be performed.

Increasing the number of resin curing lamps might be considered in order to carry out this resin curing more effectively. However, securing adequate space for the lamps is difficult since a viewing window 11 is typically provided on the lid 13 side which opens in the direction of the upper mold 11B and is for observing the inflow of the recoating resin.

Moreover, when the number of lamps is increased, then the device of course becomes more complicated with the inclusion of these parts, and costs increase.

In addition, as shown in FIGS. 12 and 13, in the above-described recoating device 10, the recoating resin leaks out between the abutting surfaces of the molds 11A, 11B, as well as into the space in between the mold grooves 16 and a sheath 1b of the optical fiber 1. Once hardened, this resin forms thin resin pieces what are called burrs 2a, 2b.

For this reason, as shown in FIG. 14, a method has been proposed for providing a light blocking layer 19, such as a metal layer, on the abutting surfaces of the molds 11A, 11B in some devices. However, in this design, the light from the resin curing lamp 17 on the base 12 side can hardly reach the mold 11B on the opposite side. Thus, this is problematic since one resin curing lamp is not sufficient.

SUMMARY OF THE INVENTION

The present invention is conceived in view of the above-described circumstances and has as its objective the provision of a recoating device which resolves the problems encountered in the conventional art, by reducing the cost of the device and promoting the curing of recoating resin even with just one resin curing lamp is provided, by means of appropriate reflected light irradiation and formation of light blocking layers on specific areas.

The first aspect of the present invention is an optical fiber recoating device for recoating a bare fiber portion of an optical fiber by filling a recoating resin into molds made of a transparent or semi-transparent material, and curing the recoating resin with light from a resin curing lamp that is provided to one side of either of the molds; wherein a reflective coating layer is provided to sides of the mold where the resin curing lamp is not located, and the light from the resin curing lamp directly radiates and is reflected to radiate onto the bare fiber portion of the optical fiber.

The second aspect of the present invention is an optical fiber recoating device according to the first aspect, wherein the reflective coating layer consists of a layer that permits transmission of visible light at a suitable ratio.

The third aspect of the present invention is an optical fiber recoating device according to the first or second aspect, wherein the outer shape of the mold in which the reflective coating layer is provided is curved or has multi-sided surfaces, so that the reflected light from the resin curing lamp is converged to reflect onto the bare fiber portion of the optical fiber.

The fourth aspect of the present invention is an optical fiber recoating device according to the first, second, or third aspect, wherein a light blocking layer is provided to at least one of the abutting surfaces of the molds at an area extending from the mold groove side of the molds, so that the light from the resin curing lamp does not radiate the abutting surface of the molds.

The fifth aspect of the present invention is an optical fiber recoating device for recoating the bare fiber portion of an optical fiber by filling a recoating resin into molds made of a transparent or semi-transparent material, and curing the recoating resin with light from a resin curing lamp that is provided to one side of either of the molds; wherein one or two or more reflective mirrors are provided around the molds, and the light from the resin curing lamp directly radiates and is reflected to radiate onto the bare fiber portion of the optical fiber.

The sixth aspect of the present invention is an optical fiber recoating device according to the fifth aspect, wherein the reflective mirror is a flat mirror or a curved mirror.

The seventh aspect of the present invention is an optical fiber recoating device according to the fifth or sixth aspect, wherein at least one of the reflective mirrors is a moveable mirror that can slide.

The eighth aspect of the present invention is an optical fiber recoating device according to the fifth, sixth or seventh aspect, wherein a light blocking layer is provided to at least one of the abutting surfaces of the molds at an area extending from the mold groove side of the molds, so that the light from the resin curing lamp does not radiate the abutting surface of the molds.

According to the optical fiber recoating device of the present invention, through the formation of the reflective coating layer or the suitable disposition of reflective mirrors, it is possible to effectively transmit the light from the resin curing lamp to radiate not only the front surface of the recoated sheath in the optical fiber, but also the rear surface, even if just one resin curing lamp is employed. As a result, costs are reduced and an excellent resin curing effect can be obtained.

Furthermore, when the layer which transmits visible light at the suitable ratio is employed for the reflective coating layer, then inflow of the recoating resin can be easily observed from the outside. In other words, excellent workability is ensured.

Furthermore, by providing the reflective coating layer in addition to rendering the outer shape of the molds as curved or multi-sided surfaces, more efficient light radiation can be obtained due to convergence of the reflected light by this shape. Thus, an even better resin curing effect can be obtained.

Furthermore, when the flat mirrors, curved mirrors and moveable mirrors are suitably combined for the reflective mirror, even more efficient light radiation can be obtained as a result of the diverse converging functions of these mirrors. Thus, an even more excellent resin curing effect can be obtained.

In addition, by providing the light blocking layer to at least one of the abutting surfaces of the molds, at an area extending from the mold grooves, a suitable amount of reflected light can be radiated to the rear surface of the recoated sheath of the optical fiber, while at the same time, the generation of burrs in the area around the recoated sheath can be effectively prevented.

BRIEF DESCRIPTION OF THE DRAWINGS

FIG. 14 is a vertical cross-sectional view showing an example of molds incorporated into a conventional optical fiber recoating device.

DETAILED DESCRIPTION OF THE PREFERRED EMBODIMENTS

Figure 9:
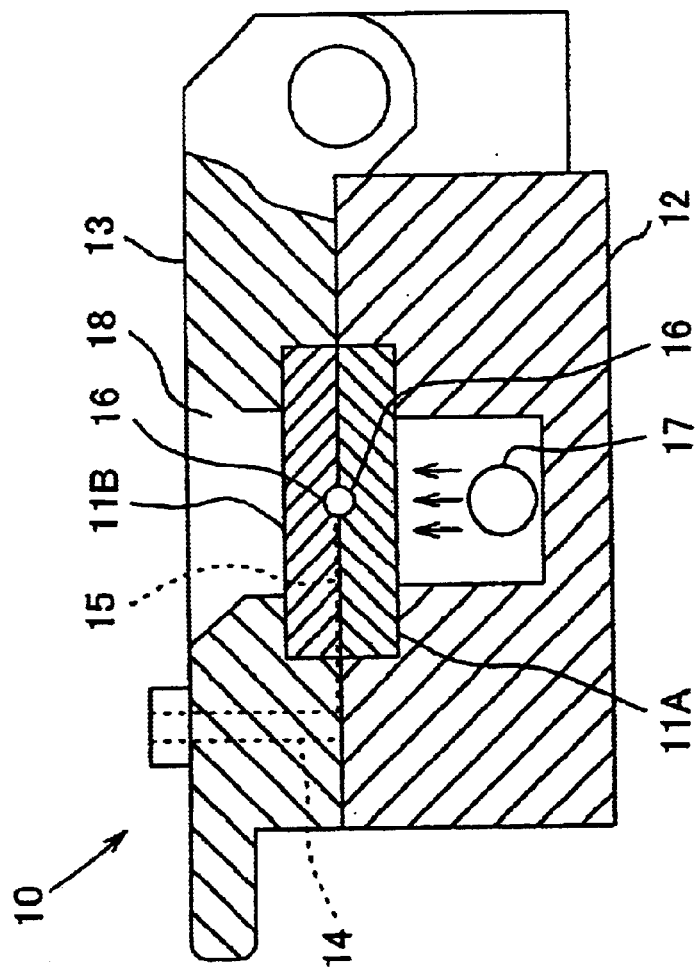
FIG. 9 is a vertical cross-sectional partial view showing a conventional optical fiber recoating device.
Figure 10:
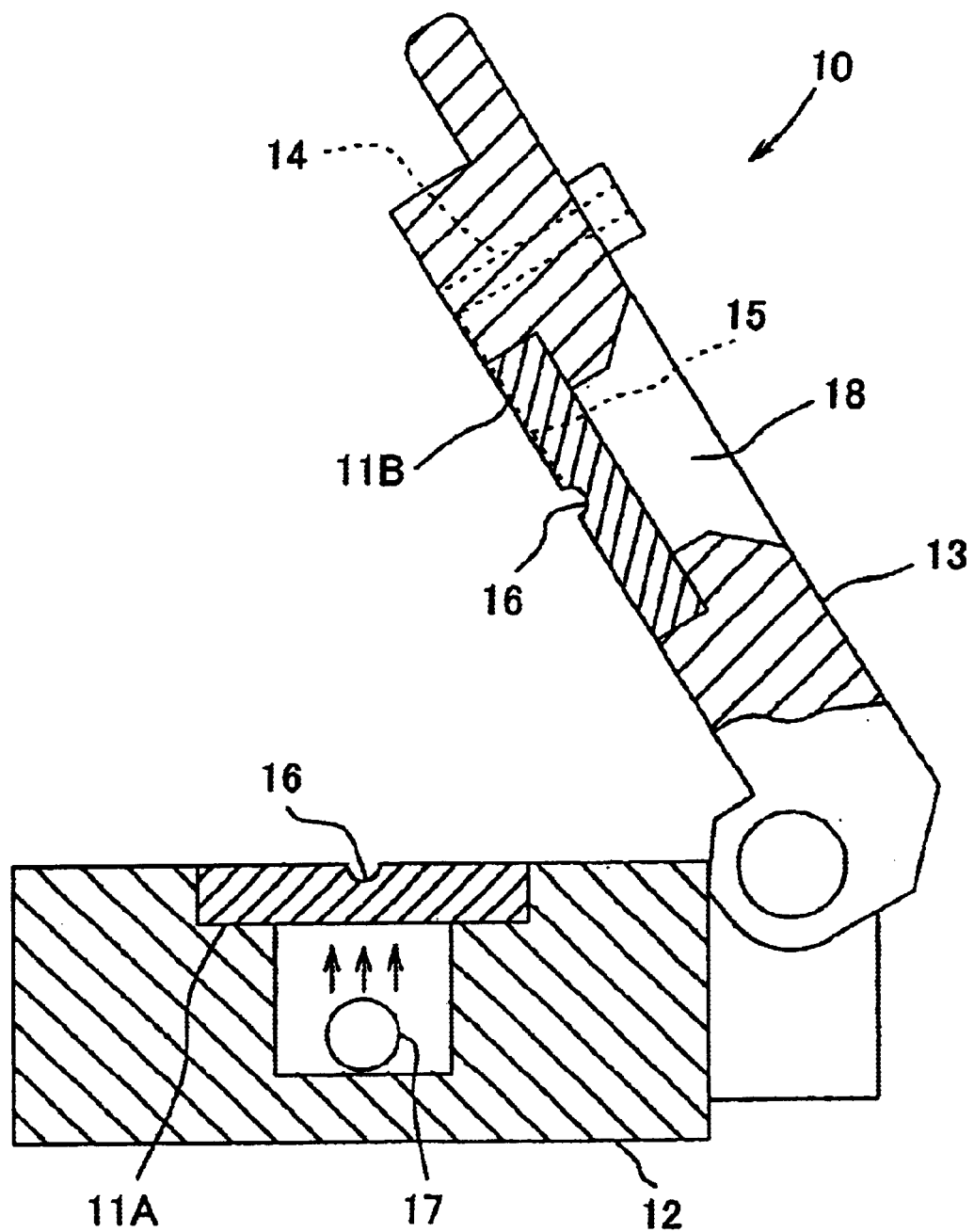
FIG. 10 is a vertical cross-sectional partial side view showing an arrangement in which the lid is open on the recoating device shown in FIG. 9.
Figure 11:
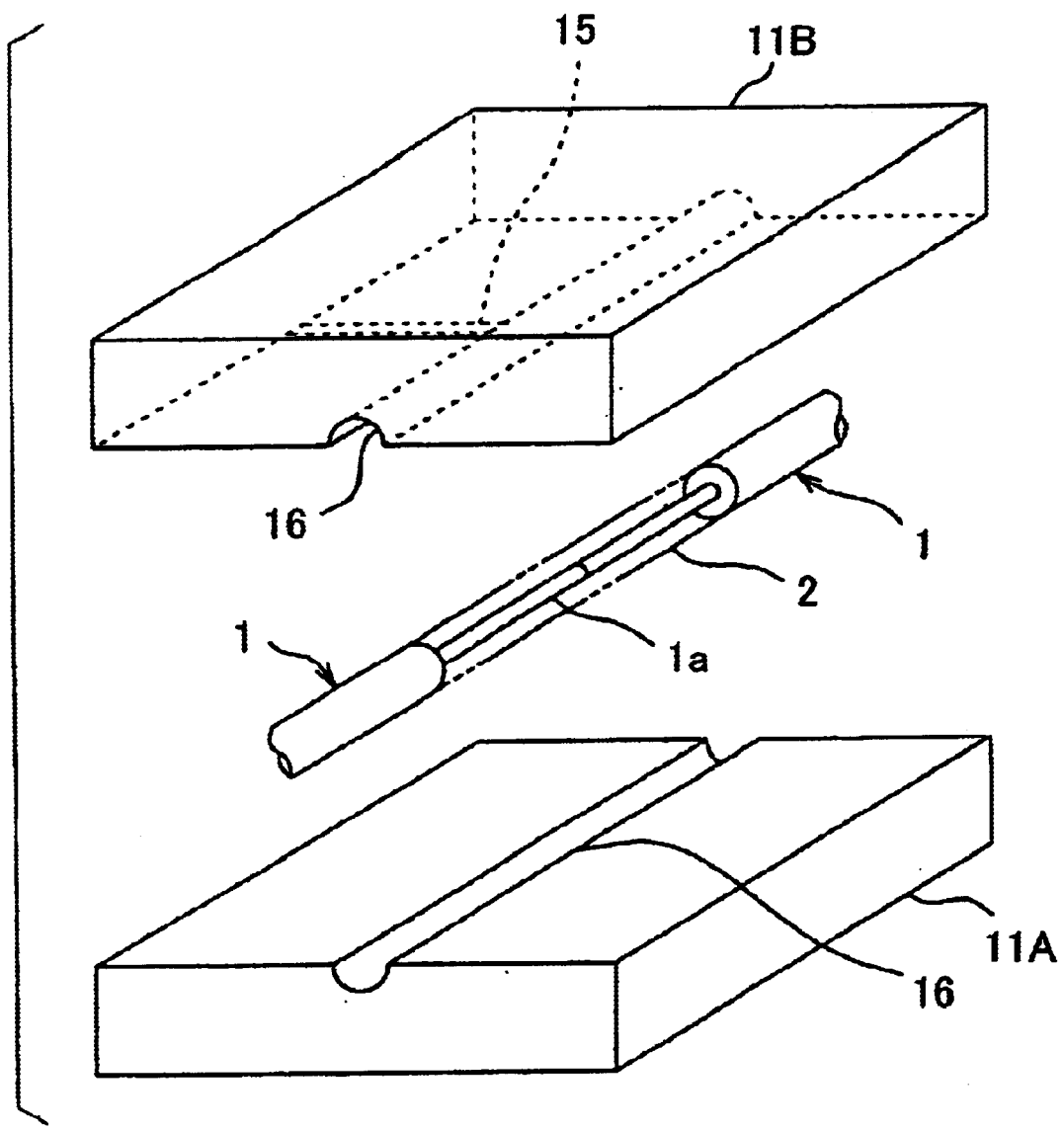
FIG. 11 is an expanded perspective view showing the relationship between the bare fiber portion of the optical fiber and both molds in the recoating device shown in FIG. 9.

Preferred embodiments of the recoating device of the present invention will be presented in the following with reference to FIGS. 1 through 8. Note that the overall design of the recoating device of the present invention is not particularly restricted, however, is roughly equivalent to that of the recoating device 10 shown in FIGS. 9 and 10. Accordingly, the same numeric symbols have been applied to parts in the following embodiments that are equivalent to those of the recoating device 10.

Figure 1:
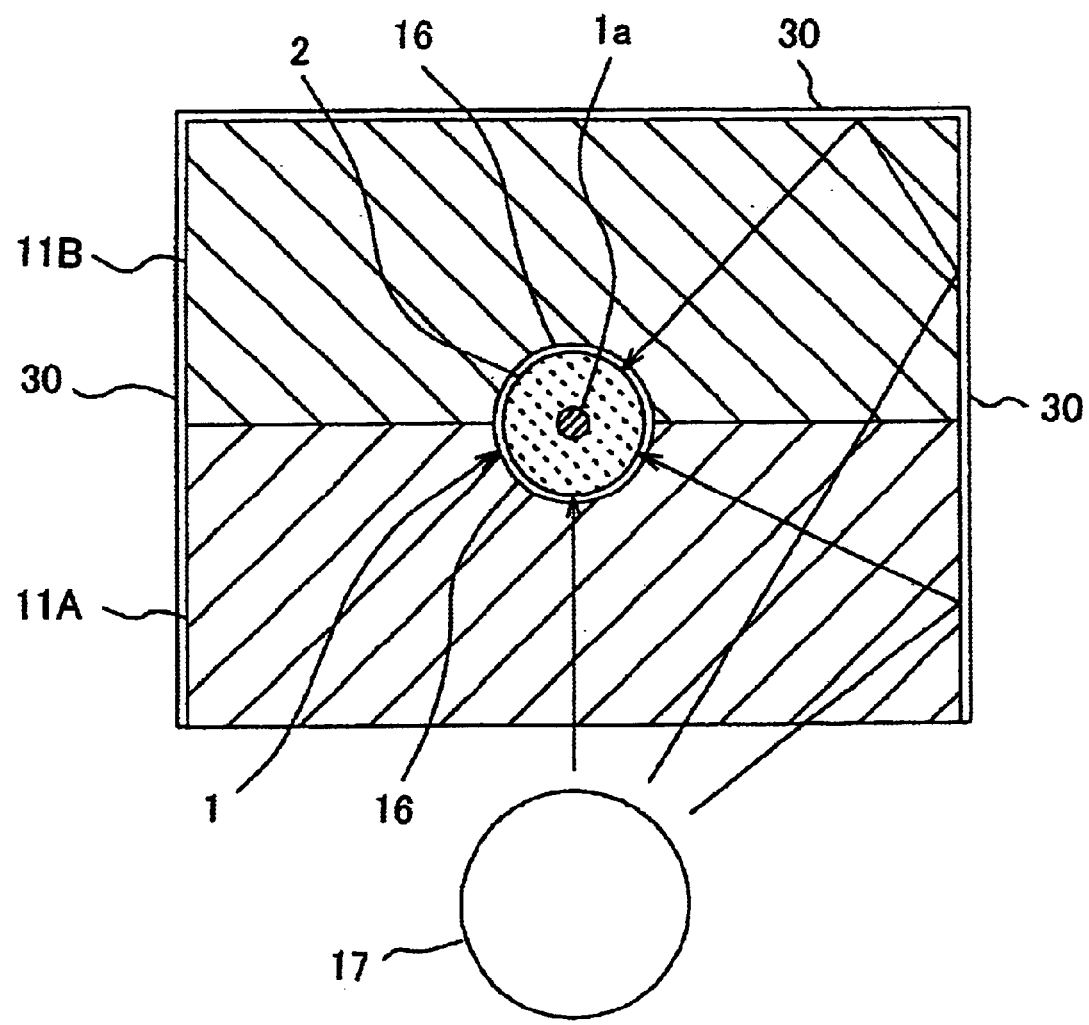
FIG. 1 is a vertical cross-sectional view of one example of molds incorporated into the optical fiber recoating device according to the present invention.

FIG. 1 shows an example of the recoating device according to the present invention and specifically shows molds incorporated into the device. These molds 11A, 11B in this recoating device are provided with a reflective coating layer 30 on sides other than where a resin curing lamp 17 such as a UV lamp or the like is located.

Accordingly, as shown in FIG. 1, by setting an optical fiber 1 in the molds 11A, 11B, filling recoating resin around a bare fiber portion 1a, i.e., into the space between the molds 11A, 11B, and activating the resin curing lamp 17, light from the resin curing lamp 17 is reflected by the reflective coating layer 30 in order to radiate a recoated sheath 2 even the rear side thereof. Of course, the recoated sheath 2 which faces the resin curing lamp 17 is directly radiated with the emitted light.

As a result, effective light radiation can be performed without any waste even with just one resin curing lamp 17, so that an excellent resin curing effect can be obtained.

The reflective coating layer 30 serving the function described above is not particularly restricted so long as it is made of a light reflecting material. A metal layer, for example, may be cited as a suitable material. However, in order to be able to observe the inflow of the recoating resin from the outside, it is desirable to provide a layer that can transmit a give proportion (about 30%) of visible light above 450 nm, for example. Layers capable of transmitting this type of visible light can be formed using vapor deposition, sputtering or another such film-forming technique.

Figure 2:
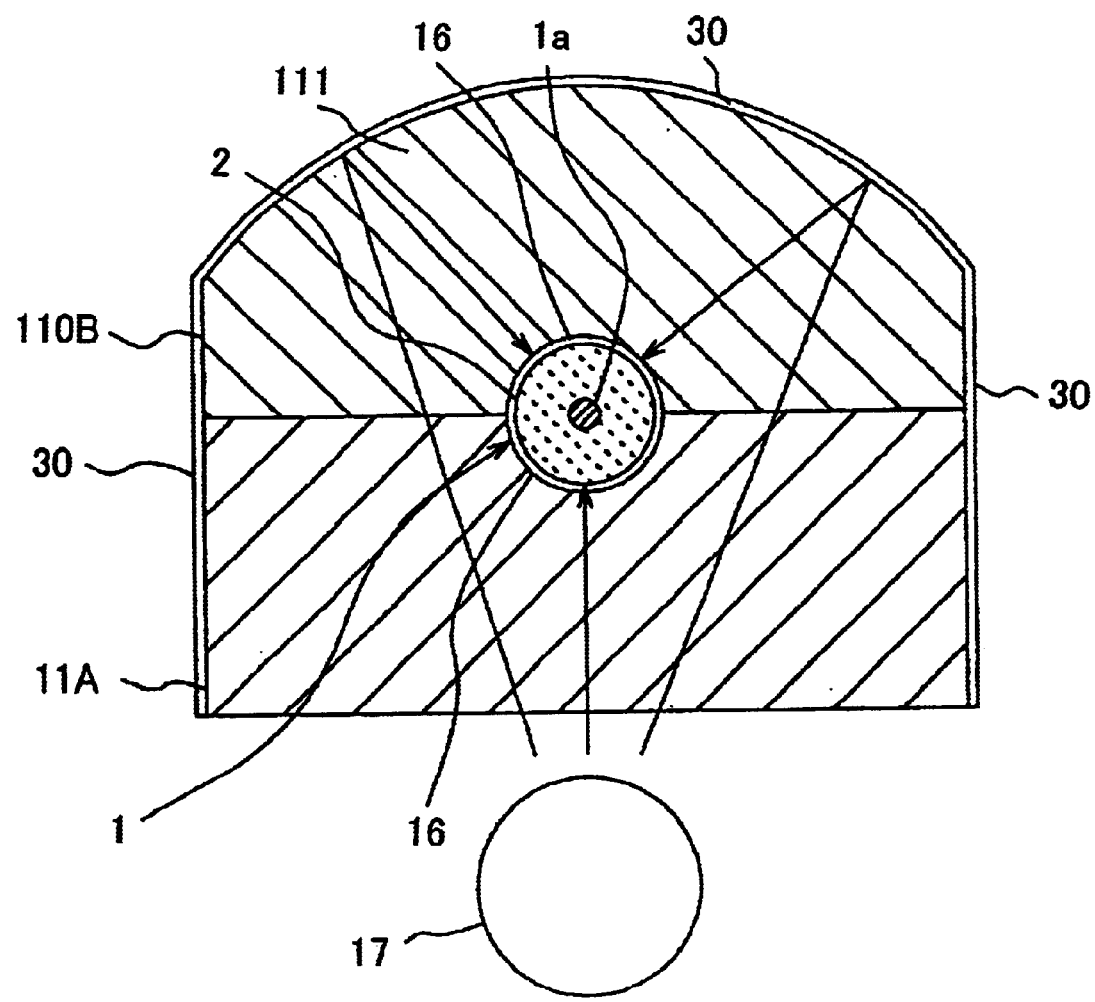
FIG. 2 is a vertical cross-sectional view of another example of molds incorporated into the optical fiber recoating device according to the present invention.

FIG. 2 shows another example of the molds incorporated into the recoating device according to the present invention. The top surface of an upper mold 110B forms a curved surface 111. Furthermore, as in the case of the design shown in FIG. 1, the reflective coating layer 30 has been provided to sides other than where the resin curing lamp 17 is located, including this curved surface 111.

By being incorporated with the reflective coating layer 30, the curved shape of the curved surface 111 is shaped to converge the reflected light onto the recoated sheath 2, as will be discussed below. Note that the shape of the top surface of the upper mold 110B is not limited to a curve in order to obtain this converging function. Rather, a suitable multi-surface design is also possible.

As shown in FIG. 2, by setting the optical fiber 1 in molds 110A, 110B, filling the recoating resin, and activating the resin curing lamp 17, the light emitted from the resin curing lamp 17 is reflected by the reflective coating layer 30 and converged, so that the light effectively irradiates the recoated sheath 2 even the rear side thereof. The recoated sheath 2 facing the resin curing lamp 17 is of course directly irradiated by the emitted light.

As a result, effective light radiation can be performed, so that excellent resin curing effects can be obtained.

Figure 3:
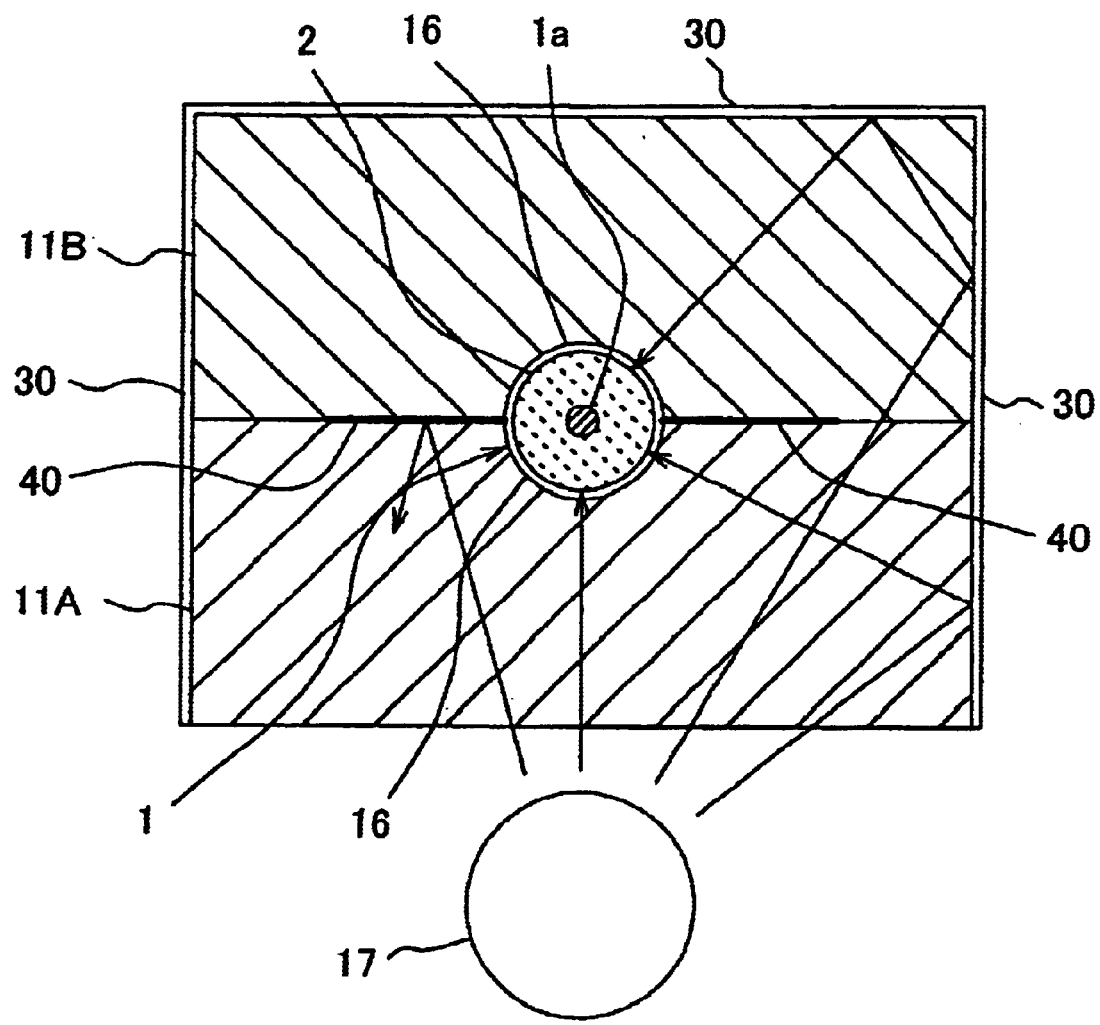
FIG. 3 is a vertical cross-sectional view of another example of molds incorporated into the optical fiber recoating device according to the present invention.

FIG. 3 shows another example of molds incorporated into the recoating device of the present invention. This design is similar to that shown in FIG. 1, however, a light blocking layer 40, such as a metal layer, is provided to at least one (both is also possible) of the abutting surfaces of the molds 11A, 11B at an area extending from the mold groove 16 side.

Figure 4:
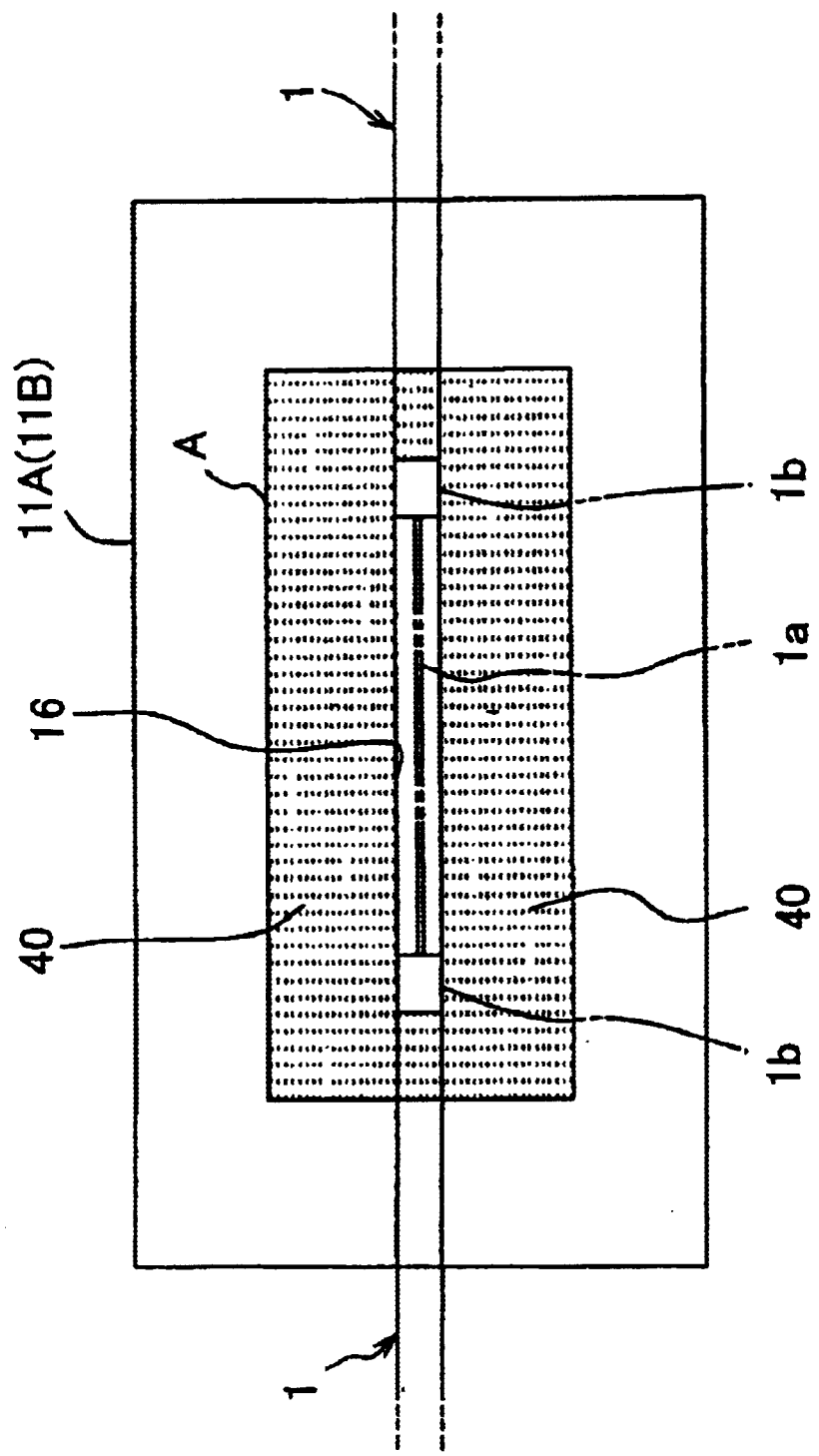
FIG. 4 is a planar view showing the arrangement of the light blocking layer in the mold in the recoating device shown in FIG. 3.

Note that a region A in which this light blocking layer 40 is formed is not particularly restricted and may, for example, be as shown in FIG. 4. In other words, the region A is formed only the area around a mold space in which a bare fiber portion 1a of the optical fiber 1 is housed.

Accordingly, as shown in FIG. 3, by setting the optical fiber 1 in the molds 11A, 11B, filling the recoating resin, and activating the resin curing lamp 17, the light emitted from the resin curing lamp 17 which proceed through the area where the light blocking layer 40 is absent (i.e., the area in which the light blocking layer 40 is not formed) toward the opposite side is reflected by the reflective coating layer 30, and effectively irradiates the recoated sheath 2 even the rear side thereof.

In other words, the light radiated at areas other than around the recoated sheath 2 sufficiently irradiates the rear surface of recoated sheath 2. Thus, an efficient radiation can be performed and an excellent curing effect can be obtained.

Figure 12:
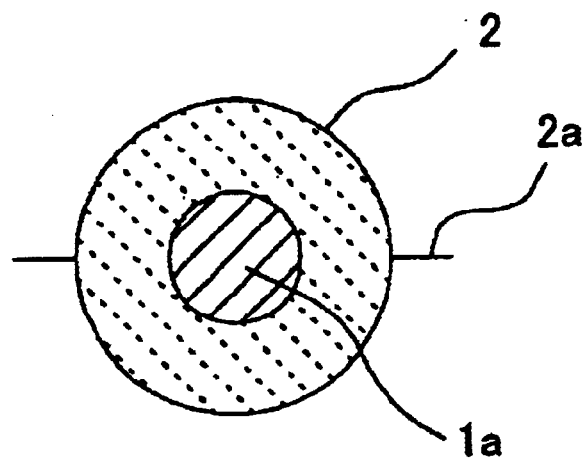
FIG. 12 is a vertical cross-sectional view showing the state of the burrs in the recoated sheath of the optical fiber obtained using the recoating device in FIG. 9.
Figure 13:
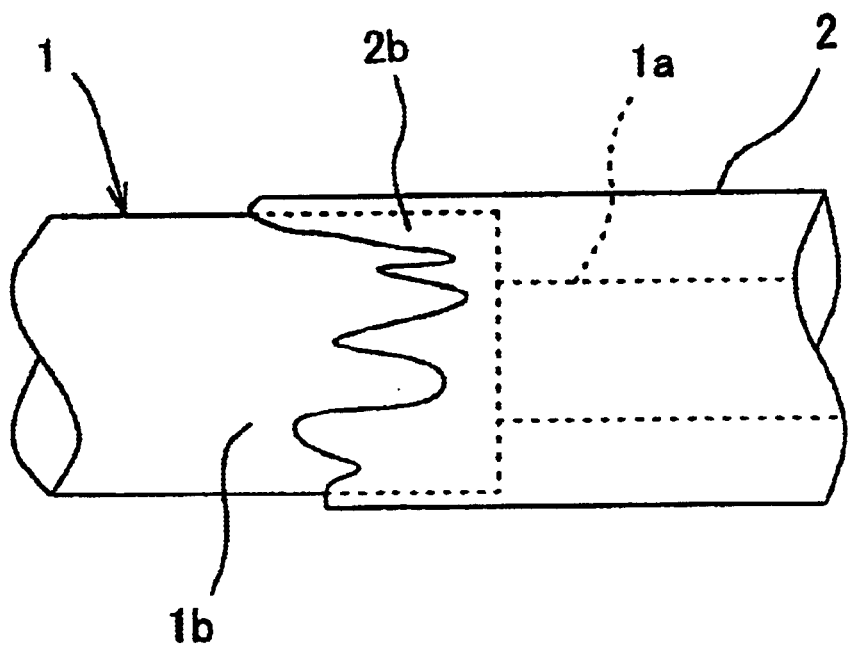
FIG. 13 is a side view showing the state of the burrs in the recoated sheathed area of the optical fiber obtained using the recoating device in FIG. 9.

Furthermore, since the emitted light does not irradiate the area around the recoated sheath 2, i.e., the abutting surfaces of the molds 11A, 11B and the area between mold grooves 16 and the sheath 1b, due to the presence of the light blocking layer 40, the formation of burrs 2a, 2b such as shown in FIGS. 12 and 13 can be effectively limited.

Note that the formation of this partial light blocking layer 40 can be effectively utilized in the recoating device shown in FIG. 2, as well as in the other recoating devices described below.

Figure 5:
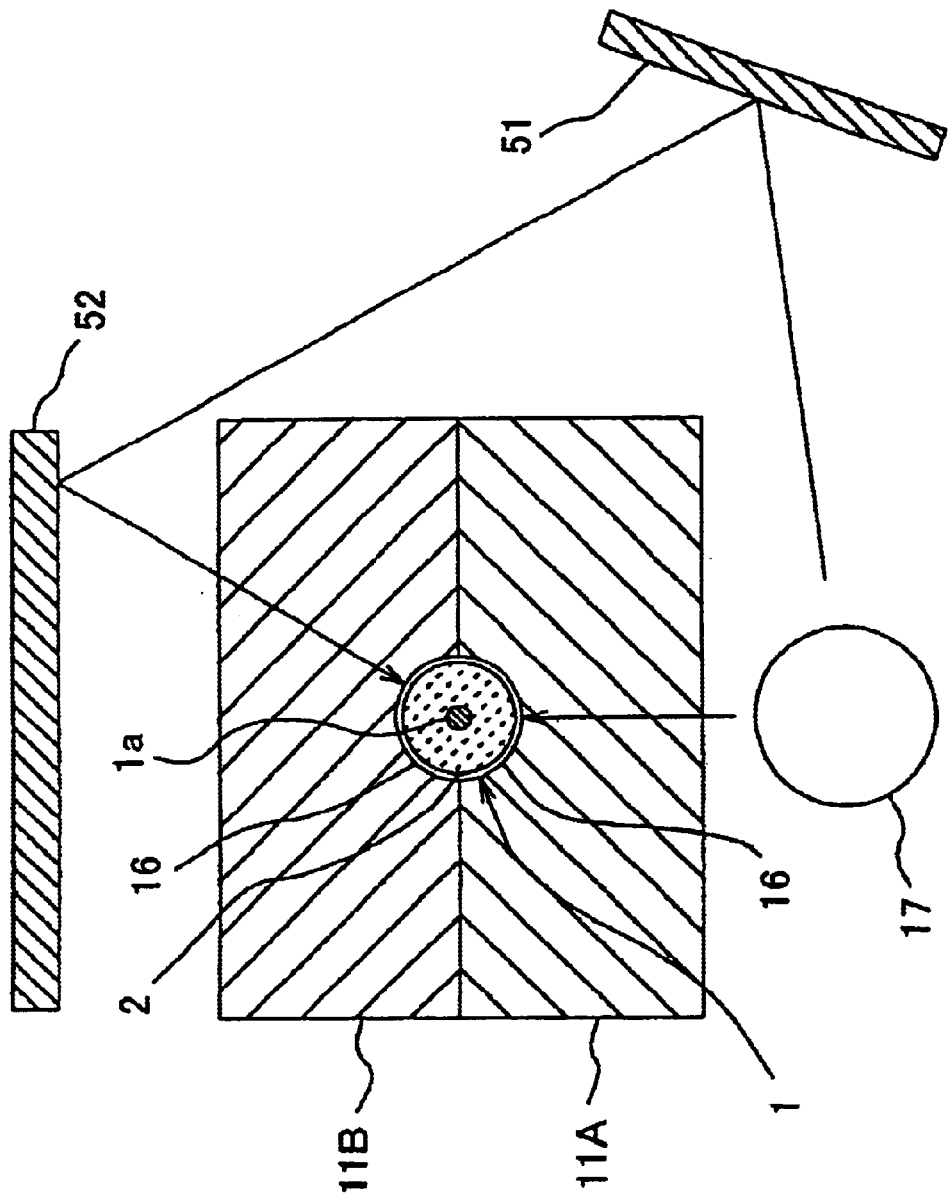
FIG. 5 is a vertical cross-sectional partial view showing an example of the optical fiber recoating device according to the present invention.
Figure 6:
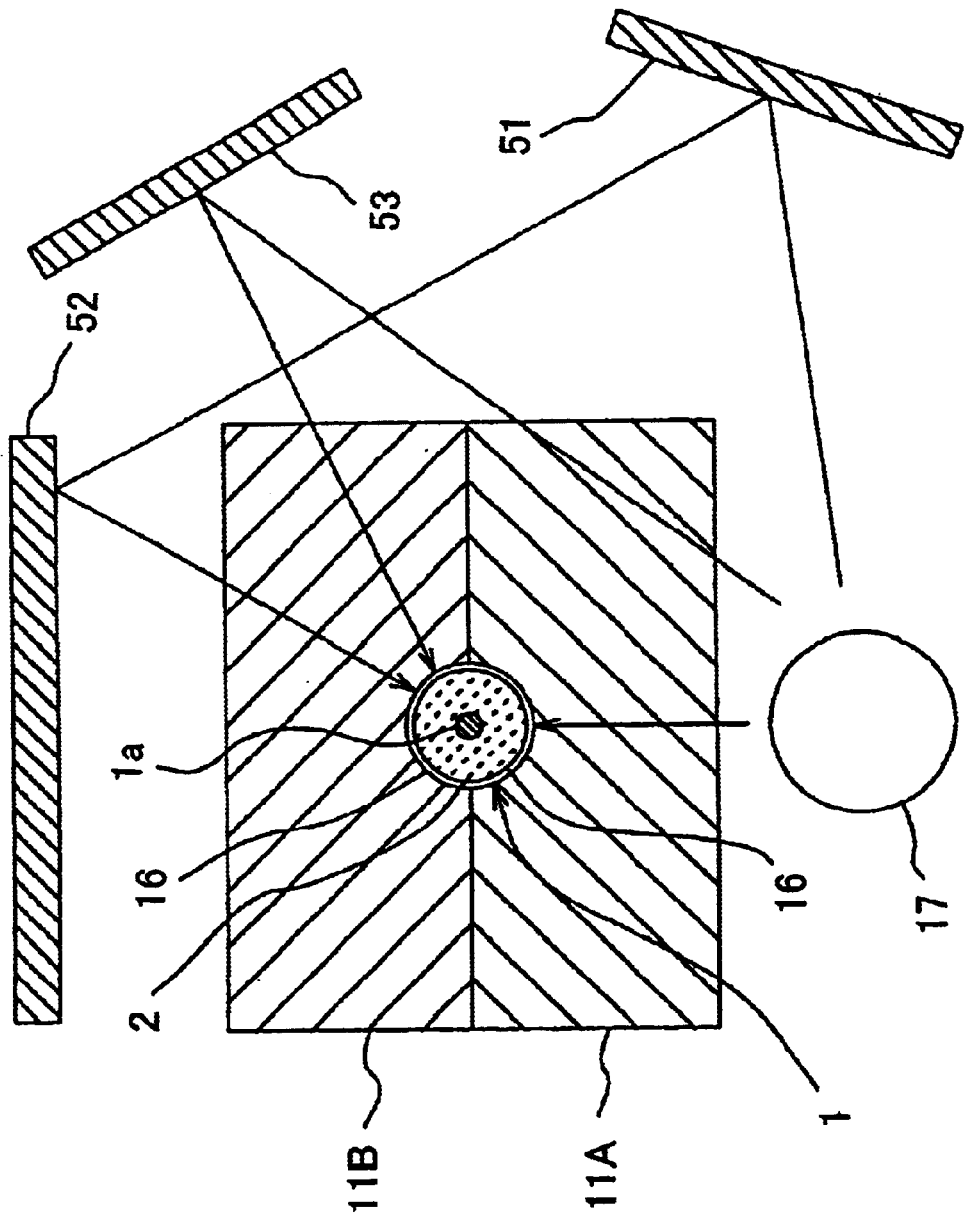
FIG. 6 is a vertical cross-sectional view showing another example of the optical fiber recoating device according to the present invention.

FIGS. 5 and 6 show another example of the recoating device of the present invention. In this device, reflective mirrors 51, 52, and 53, consisting of two or more flat mirrors, are provided at the periphery of the molds 11A, 11B for reflecting the light emitted from the resin curing lamp 17. Note that the number of mirrors is not restricted. Namely, one mirror, or four or more mirrors, may be used according to the arrangement of the device.

As shown in FIGS. 5 and 6, by setting the optical fiber 1 in the molds 11A, 11B, filling the recoating resin, and activating the resin curing lamp 17, the light which is emitted from the resin curing lamp 17 and reflected by the reflective mirrors 51~53, effectively irradiates the recoated sheath 2 even the rear side thereof.

As a result, even if a reflective coating layer 30 is not present, effective radiation as in the case of FIG. 1 is possible, so that an excellent curing effect can be obtained.

Figure 7:
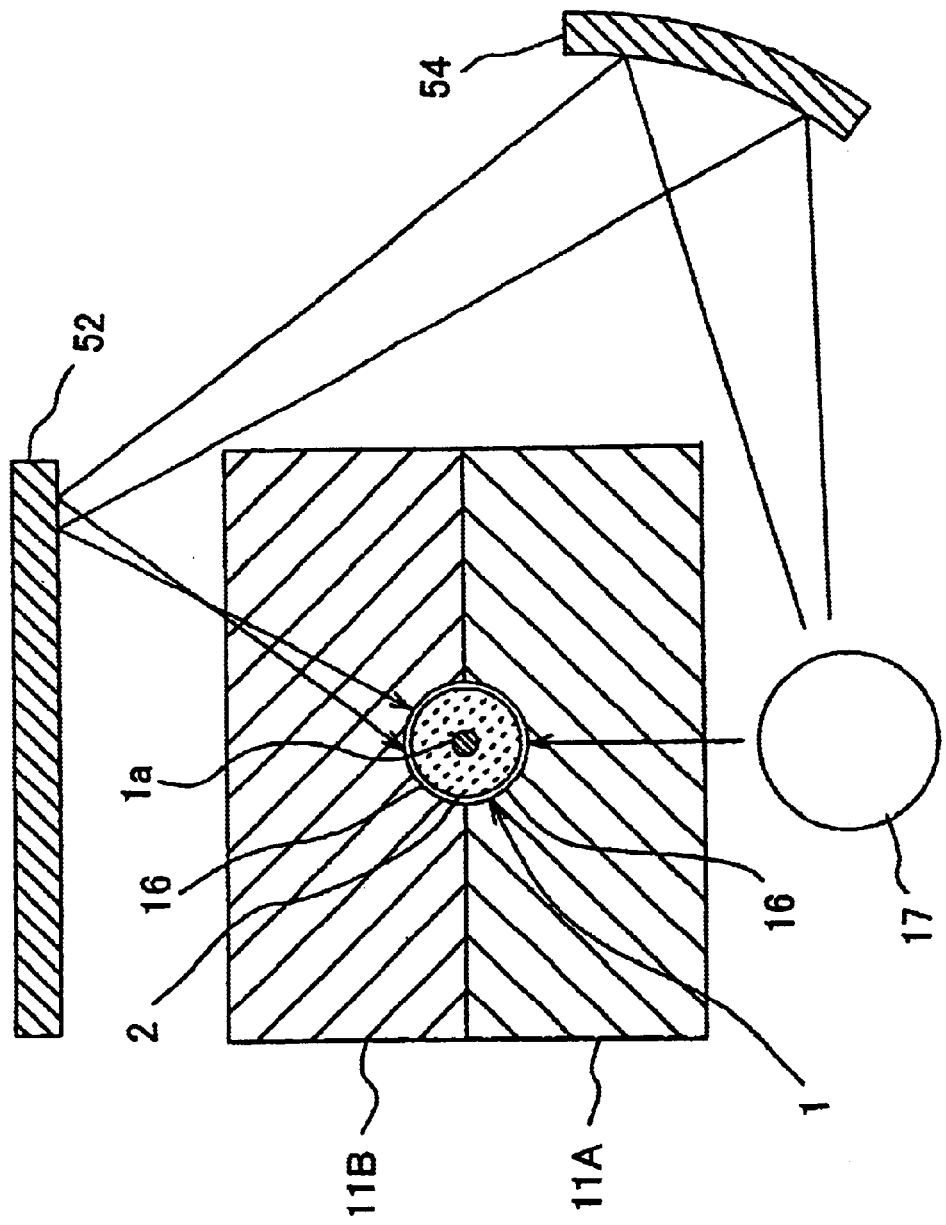
FIG. 7 is a vertical cross-sectional view showing another example of the optical fiber recoating device according to the present invention.
Figure 8:
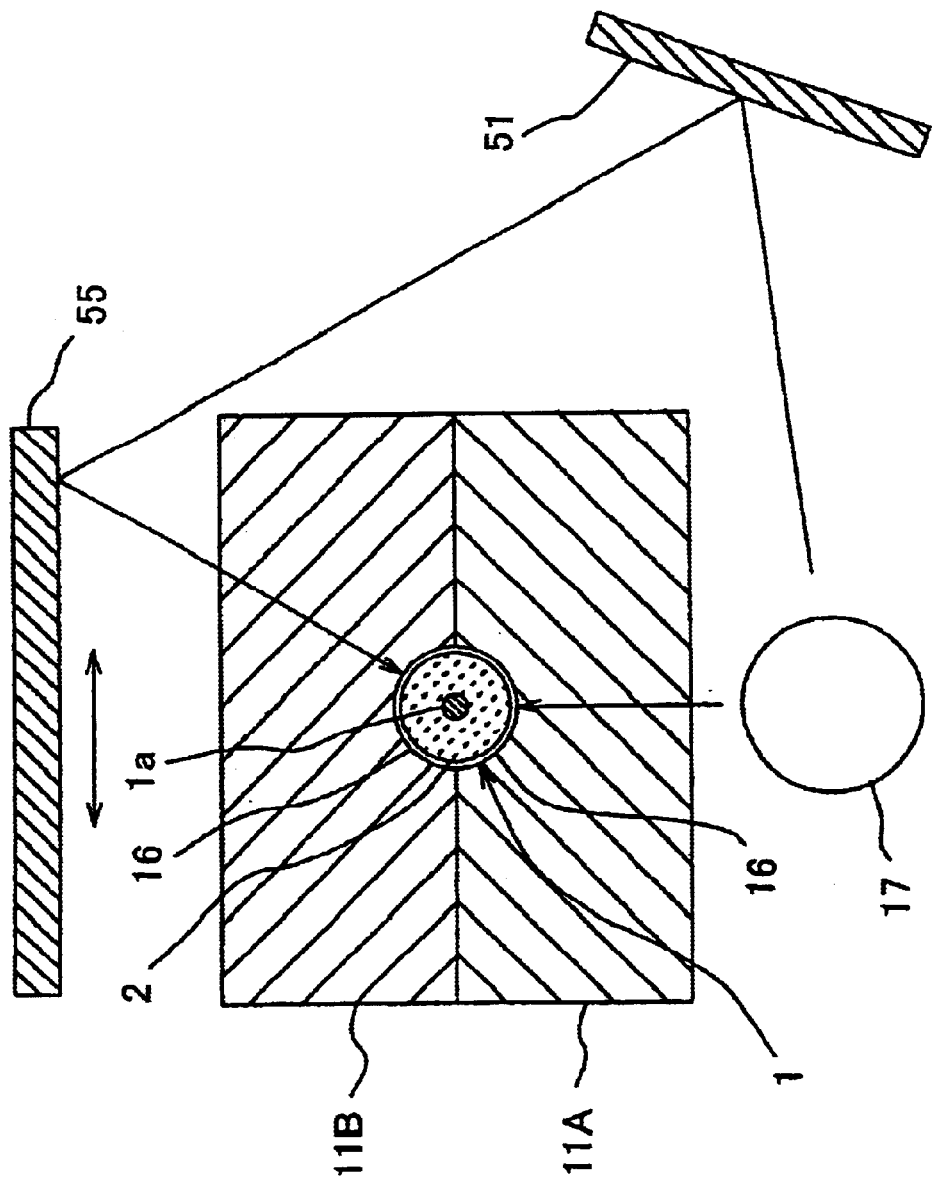
FIG. 8 is a vertical cross-sectional view showing another example of the optical fiber recoating device according to the present invention.

FIGS. 7 and 8 show another example of the recoating device of the present invention. These devices basically have the same structure as the devices shown in FIGS. 5 and 6. However, in the recoating device shown in FIG. 7, the reflective mirrors 52, 54 consist of a combination of a flat mirror and a curved mirror which is concave in shape and functions to converge the light. On the other hand, in the recoating device shown in FIG. 8, the reflective mirrors 51, 55 are both flat mirrors, however, one of these is a moveable mirror which is freely moveable. Note that the combination flat mirrors, curved mirrors, and moveable mirrors, as well as the number of mirrors employed, is not restricted by these embodiments.

As shown in the figures, by setting the optical fiber 1 in the molds 11A, 11B, filling the recoating, and activating the resin curing lamp 17, the light emitted from the resin curing lamp 17 is reflected by the reflective mirrors 51–55, so that the light effectively irradiates the recoated sheath 2 even the rear side thereof. As a result, as in the case of the device in FIG. 1, efficient light radiation is possible, and an excellent resin curing effect can be obtained. In particular, even more efficient radiating properties are obtained from the converging function of the curved mirror 54 in the recoating device shown in FIG. 7. Furthermore, as a result of the movement of the moveable mirror 55 in the recoating device shown in FIG. 8, it is possible to observe the inflow of the recoating resin from the outside.

Note that the preceding embodiments described the case where the molds 11A, 11B and 111B were made of quartz glass, however, the present invention is not limited thereto. Rather, it is also acceptable to employ a light transmissive mold made of a semi-transparent glass, such as colored glass, or other such material.

What is claimed is:

1. An optical fiber recoating device for recoating a bare fiber portion of an optical fiber by filling a recoating resin into molds made of a transparent or semi-transparent material, and curing said recoating resin with light from a resin curing lamp that is provided to one side of one of said molds, wherein a reflective coating layer that consists of a layer that permits transmission of visible light at a suitable ratio is provided on sides of said molds where said resin curing lamp is not located, and the light from said resin curing lamp directly radiates and is reflected to radiate onto said bare fiber portion of said optical fiber.

2. An optical fiber recoating device according to claim 1, wherein the outer shape of said mold in which said reflective coating layer is provided is curved or has multi-sided surfaces, and the reflected light from said resin curing lamp is converged and radiated onto said bare fiber portion of said optical fiber.

3. An optical fiber recoating device according to claim 1, wherein a light blocking layer is provided to at least one of abutting surface of said molds at an area extending from a mold groove side of said molds, so that the light from said resin curing lamp does not radiate to the abutting surface of said molds.

4. An optical fiber recoating device according to claim 2, wherein a light blocking layer is provided to at least one of abutting surfaces of said molds at an area extending from a mold groove side of said molds, so that the light from said resin curing lamp does not radiate to the abutting surface of said molds.

5. An optical fiber recoating device for recoating a bare fiber portion of an optical fiber by filling a recoating resin into molds made of a transparent or semi-transparent material, and curing said recoating resin with light from a resin curing lamp that is provided to one side of one of said molds, wherein one or two or more reflective mirrors are provided around said molds, and the light from said resin curing lamp directly radiates and is reflected to radiate onto said bare fiber portion of said optical fiber and wherein at least one of said reflective mirrors is a movable mirror that can slide.

6. An optical fiber recoating device according to claim 5 wherein said at least one reflective mirror is a flat mirror or a curved mirror.

7. An optical fiber recoating device for recoating a bare fiber portion of an optical fiber by filling a recoating resin into molds made of a transparent or semi-transparent material, and curing said recoating resin with light from a resin curing lamp that is provided to one side of one of said molds, wherein one or two or more reflective mirrors are provided around said molds, and the light from said resin curing lamp directly radiates and is reflected to radiate onto said bare fiber portion of said optical fiber and wherein at least one of said reflective mirrors is a movable mirror that can slide, and said at least one reflective mirror is a flat mirror or a curved mirror.

8. An optical fiber recoating device according to claim 5, wherein a light blocking layer is provided to at least one abutting surface of said molds at an area extending from a mold groove side of said molds, so that the light from said resin curing lamp does not radiate the abutting surface of said molds.

9. An optical fiber recoating device according to claim 7, wherein a light blocking layer is provided to at least one abutting surface of said molds at an area extending from a mold groove side of said molds, so that the light from said resin curing lamp does not radiate the abutting surface of said molds.

* * * * *